United States Patent
Luo et al.

(10) Patent No.: US 11,129,191 B2
(45) Date of Patent: Sep. 21, 2021

(54) SIGNAL TRANSMISSION METHOD AND DEVICE

(71) Applicant: HUAWEI TECHNOLOGIES CO., LTD., Shenzhen (CN)

(72) Inventors: Jun Luo, Kista (SE); Jiayin Zhang, Shanghai (CN); Lei Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 16/583,702

(22) Filed: Sep. 26, 2019

(65) Prior Publication Data

US 2020/0022185 A1   Jan. 16, 2020

Related U.S. Application Data

(63) Continuation of application No. PCT/CN2018/081284, filed on Mar. 30, 2018.

(30) Foreign Application Priority Data

Mar. 31, 2017   (CN) .......................... 201710209047.2

(51) Int. Cl.
*H04W 74/08* (2009.01)
*H04W 56/00* (2009.01)

(52) U.S. Cl.
CPC ..... *H04W 74/0808* (2013.01); *H04W 56/001* (2013.01)

(58) Field of Classification Search
CPC combination set(s) only.
See application file for complete search history.

(56) References Cited

U.S. PATENT DOCUMENTS

| 2014/0198772 | A1  | 7/2014 | Baldemair et al. |
| 2016/0127098 | A1* | 5/2016 | Ng .......... H04L 5/0048 370/329 |

(Continued)

FOREIGN PATENT DOCUMENTS

| CN | 103428143 A | 12/2013 |
| CN | 105075354 A | 11/2015 |

(Continued)

OTHER PUBLICATIONS

Huawei Hisilicon: "NR Primary and Secondary Synchronization Signals Design", 3GPP Draft; R1-1611261, Nov. 13, 2016, total 10 pages.

*Primary Examiner* — Ayanah S George
(74) *Attorney, Agent, or Firm* — Rimon PC

(57) ABSTRACT

Embodiments of this application provide a signal transmission method and a device. The method includes: performing, by a network device, idle carrier sense in a downlink beam direction when a predefined sending time of each synchronization frame in a synchronization frame set arrives, where the synchronization frame set includes N synchronization frames, and each synchronization frame includes at least one synchronization signal block; and sending a synchronization signal block to a terminal in the downlink beam direction in a synchronization frame in which idle carrier sense succeeds, where the synchronization signal block includes a synchronization signal. The network device performs idle carrier sense in the downlink beam direction when the predefined sending time of each synchronization frame arrives, and sends the synchronization signal block including the synchronization signal in the downlink beam direction in the synchronization frame in which idle carrier sense succeeds.

16 Claims, 9 Drawing Sheets

When each predetermined sending time of each synchronization frame arrives, a network device performs idle carrier sense in a downlink beam direction corresponding to the predetermined sending time, where each synchronization frame corresponds to M downlink beam directions that are the same, each synchronization frame has M predetermined sending times, different predetermined sending times of a same synchronization frame correspond to different downlink beam directions, and different synchronization signal blocks of a same synchronization frame correspond to different downlink beam directions — S301

The network device sends the synchronization signal block in each synchronization frame in a downlink beam direction corresponding to a predetermined sending time at which idle carrier sense succeeds — S302

(56) References Cited

U.S. PATENT DOCUMENTS

2016/0360420 A1\* 12/2016 Liu ................... H04L 5/0057
2018/0159926 A1\* 6/2018 Sun ................... H04W 88/04
2018/0270691 A1\* 9/2018 Chendamarai Kannan ................
H04L 5/0048

FOREIGN PATENT DOCUMENTS

CN 106131947 A 11/2016
WO 2016203290 A1 12/2016

\* cited by examiner

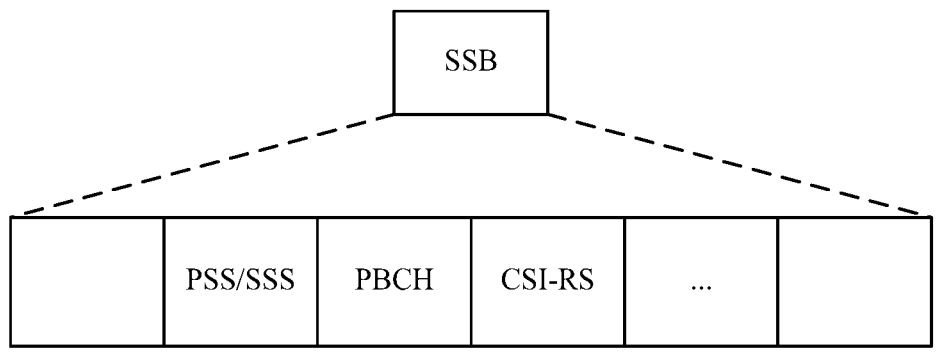

SIGNAL TRANSMISSION METHOD AND DEVICE

CROSS-REFERENCE TO RELATED APPLICATIONS

This application is a continuation of International Application No. PCT/CN2018/081284, filed on Mar. 30, 2018, which claims priority to Chinese Patent Application No. 201710209047.2, filed on Mar. 31, 2017. The disclosures of the aforementioned applications are hereby incorporated by reference in their entireties.

TECHNICAL FIELD

Embodiments of this application relate to the field of communications technologies, and in particular, to a signal transmission method and a device.

BACKGROUND

In an existing LTE system, measurements of a downlink signal can be used in radio resource management (Radio Resource Management, RRM). In one embodiment, a base station sends a downlink reference signal, for example, a cell reference signal (Cell Reference Signal, CRS) having a fixed time-frequency location, and a terminal generates a measurement result such as reference signal received power (RSRP)/reference signal received quality (RSRQ) of the CRS sent by the base station, and reports the measurement result to the base station, so that the base station can determine the movement of UEs and if a handover is needed. In a next-generation wireless communications system that uses multi-beam transmission techniques, how to design the transmission mode of a synchronization signal is worth studying.

SUMMARY

Embodiments of this application provide a signal transmission method and a device, to transmit a synchronization signal in a multiple-beam scenario.

According to a first aspect, an embodiment of this application provides a signal transmission method, including: performing, by a network device, idle carrier sense in a downlink beam direction when a predefined sending time of each synchronization frame in a synchronization frame set arrives, where the synchronization frame set includes N synchronization frames, N is a positive integer, and each synchronization frame includes at least one synchronization signal block; and sending a synchronization signal block including a synchronization signal to a terminal in the downlink beam direction in a synchronization frame in which idle carrier sense succeeds. Therefore, the network device performs idle carrier sense in the downlink beam direction when the predefined sending time of each synchronization frame arrives, and sends the synchronization signal block including the synchronization signal in the downlink beam direction in the synchronization frame in which idle carrier sense succeeds. This implements how to transmit the synchronization signal, and also implements idle carrier sense in the downlink beam direction in an unlicensed high-band system.

In a possible design, the synchronization signal block in each synchronization frame corresponds to a same downlink beam direction, each of the N synchronization frames corresponds to a different downlink beam direction, and each synchronization frame has a predefined sending time; the performing, by a network device, idle carrier sense in a downlink beam direction when a predefined sending time of each synchronization frame in a synchronization frame set arrives is specifically: when the predefined sending time of each synchronization frame arrives, performing, by the network device, idle carrier sense in a downlink beam direction corresponding to the synchronization frame; and the sending a synchronization signal block to a terminal in the downlink beam direction in a synchronization frame in which idle carrier sense succeeds is specifically: in the synchronization frame in which idle carrier sense succeeds, sending a plurality of synchronization signal blocks in the downlink beam direction corresponding to the synchronization frame in which idle carrier sense succeeds. In this embodiment, each synchronization frame corresponds to a different downlink beam direction, and when the predefined sending time of each synchronization frame arrives, the network device performs idle carrier sense once in the downlink beam direction corresponding to the synchronization frame, thereby reducing overheads of idle carrier sense.

In a possible design, each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than or equal to 1; the performing, by a network device, idle carrier sense in a downlink beam direction when a predefined sending time of each synchronization frame in a synchronization frame set arrives is specifically: when each predefined sending time of each synchronization frame arrives, performing idle carrier sense in a downlink beam direction corresponding to the predefined sending time; and the sending a synchronization signal block to a terminal in the downlink beam direction in a synchronization frame in which idle carrier sense succeeds is specifically: in each synchronization frame, sending the synchronization signal block in a downlink beam direction corresponding to a predefined sending time at which idle carrier sense succeeds. Each synchronization frame has a plurality of predefined sending times, and each predefined sending time corresponds to a different downlink beam direction. Therefore, the network device performs idle carrier sense in each synchronization frame in different downlink beam directions, and the synchronization signal block is sent in the plurality of downlink beam directions in each synchronization frame. Therefore, a synchronization time of the terminal and the network device is advanced and synchronization efficiency is improved.

In a possible design, each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, and M and K are integers greater than or equal to 1; and the performing, by a network device, idle carrier sense in a downlink beam direction when a predefined sending time of each synchronization frame in a synchronization frame set arrives is specifically: performing idle carrier sense once when each predefined sending time of each synchronization frame arrives, where a direction of idle carrier sense includes the plurality of downlink beam directions corresponding to the predefined sending time; and the sending a synchronization signal block to a terminal in the downlink beam direction in a synchronization frame in which idle carrier sense succeeds includes: in each synchronization frame, sequentially sending the synchronization signal block in a plurality of downlink beam directions corresponding to a predefined sending time at which idle carrier sense succeeds. Each synchronization frame has the plurality of predefined sending times, and each predefined sending time correspond to the plurality of different downlink beam directions. Therefore, the network device performs only idle carrier sense in each synchronization frame in the plurality of different downlink beam directions, thereby reducing overheads of idle carrier sense. In addition, a synchronization time of the terminal and the network device is advanced and synchronization efficiency is improved.

In a possible design, the synchronization signal block further includes: a downlink measurement signal and/or a physical broadcast channel (Physical Broadcast Channel, PBCH).

In a possible design, the downlink measurement signal is a configurable reference signal. The downlink measurement signal is a reference signal that may be configured for the terminal by using RRC signaling, and has a location that is not fixed. Therefore, when sending the downlink measurement signal, the network device may flexibly operate, thereby avoiding a problem of high overheads of the network device and saving network resources.

Optionally, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

Optionally, the first network device and a second network device perform idle carrier sense at a same start time, and the second network device is any network device that belongs to a same cell as the first network device. In this way, the terminal can receive a plurality of synchronization signal blocks in a same beam direction at a same time, and therefore can obtain combining gains of the synchronization signal block.

According to a second aspect, an embodiment of this application provides a signal transmission method, including: receiving, by a terminal, a first synchronization signal block sent by a first network device in a downlink beam direction, where the first synchronization signal block includes a first synchronization signal; and synchronizing with the first network device based on the first synchronization signal.

In a possible design, the terminal further receives a second synchronization signal block sent by a second network device in the downlink beam direction, where the second synchronization signal block includes a second synchronization signal. Correspondingly, the synchronizing, by the terminal, with the first network device based on the first synchronization signal includes: combining the first synchronization signal sent by the first network device and the second synchronization signal sent by the second network device, to obtain combined synchronization signals; and synchronizing with the first network device based on the combined synchronization signals. Correspondingly, the terminal further synchronizes with the second network device based on the combined synchronization signals. In this way, the terminal can obtain gains of the synchronization signal.

In a possible design, a synchronization signal block further includes: a downlink measurement signal and/or a PBCH, and the synchronization signal block is the first synchronization signal block or the second synchronization signal block.

In a possible design, the downlink measurement signal is a configurable reference signal.

In a possible design, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

According to a third aspect, an embodiment of this application provides a signal transmission method, including: performing, by a terminal, idle carrier sense in an uplink beam direction; and when idle carrier sense succeeds in the uplink beam direction, sending an uplink measurement signal to a network device in the uplink beam direction. Therefore, the terminal sends the uplink measurement signal in the uplink beam direction corresponding to successful idle carrier sense, to transmit the uplink measurement signal in a multiple-beam scenario, and implement a solution of idle carrier sense in the downlink beam direction in an unlicensed high-band system.

In a possible design, there is at least one uplink beam direction, and the uplink beam direction includes a plurality of uplink beam sub-directions. Correspondingly, the sending, by the terminal, an uplink measurement signal to a network device in the uplink beam direction is specifically: sequentially sending, by the terminal, the uplink measurement signal to the network device in the plurality of uplink beam sub-directions of the uplink beam direction. Idle carrier sense is simultaneously performed in the plurality of uplink beam sub-directions, thereby reducing a quantity of times of idle carrier sense and a delay of idle carrier sense.

In a possible design, when there is one uplink beam direction, the uplink beam direction is omnidirectional.

In a possible design, the uplink beam direction is the same as a downlink beam direction corresponding to a synchronization signal received by the terminal. The terminal chooses to perform idle carrier sense in the uplink beam direction that is the same as the downlink beam direction corresponding to the received synchronization signal, and does not need to perform idle carrier sense in all uplink beam directions. This may reduce a quantity of uplink beam directions in which idle carrier sense is performed, improves efficiency of measuring and tracing the terminal by the network device, and may reduce power consumption of the terminal.

According to a fourth aspect, an embodiment of this application provides a network device, including: a processor and a transmitter. The processor is configured to: when a predefined sending time of each synchronization frame in a synchronization frame set arrives, perform idle carrier sense in a downlink beam direction, where the synchronization frame set includes N synchronization frames, N is a positive integer, and each synchronization frame includes at least one synchronization signal block; and the transmitter is configured to send a synchronization signal block to a terminal in the downlink beam direction in a synchronization frame in which idle carrier sense succeeds, where the synchronization signal block includes a synchronization signal.

In a possible design, the synchronization signal block in each synchronization frame corresponds to a same downlink beam direction, each of the N synchronization frames corresponds to a different downlink beam direction, and each synchronization frame has a predefined sending time; the processor is specifically configured to: when the predefined sending time of each synchronization frame arrives, perform idle carrier sense in a downlink beam direction corresponding to the synchronization frame; and the transmitter is specifically configured to: in the synchronization frame in which idle carrier sense succeeds, send a plurality of synchronization signal blocks in the downlink beam direction corresponding to the synchronization frame in which idle carrier sense succeeds.

In a possible design, each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than or equal to 1; the processor is specifically configured to: when each predefined sending time of each synchronization frame arrives, perform idle carrier sense in a downlink beam direction corresponding to the predefined sending time; and the transmitter is specifically configured to: in each synchronization frame, send the synchronization signal block in a downlink beam direction corresponding to a predefined sending time at which idle carrier sense succeeds.

In a possible design, each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, and M and K are integers greater than or equal to 1; the processor is specifically configured to perform idle carrier sense once when each predefined sending time of each synchronization frame arrives, where a direction of idle carrier sense includes the plurality of downlink beam directions corresponding to the predefined sending time; and the transmitter is specifically configured to: in each synchronization frame, sequentially send the synchronization signal block in a plurality of downlink beam directions corresponding to a predefined sending time at which idle carrier sense succeeds.

In a possible design, the synchronization signal block further includes: a downlink measurement signal and/or a PBCH.

In a possible design, the downlink measurement signal is a configurable reference signal.

In a possible design, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

In a possible design, a first network device and a second network device perform idle carrier sense at a same start time, and the second network device is any network device that belongs to a same cell as the first network device.

According to a fifth aspect, an embodiment of this application provides a terminal, including: a receiver and a processor. The receiver is specifically configured to receive a first synchronization signal block sent by a first network device in a downlink beam direction, where the first synchronization signal block includes a first synchronization signal; and the processor is specifically configured to synchronize with the first network device based on the first synchronization signal.

In a possible design, the receiver is further configured to receive a second synchronization signal block sent by a second network device in the downlink beam direction, where the second synchronization signal block includes a second synchronization signal. The processor is specifically configured to: combine the first synchronization signal sent by the first network device and the second synchronization signal sent by the second network device, to obtain combined synchronization signals; and synchronize with the first network device based on the combined synchronization signals; and synchronize with the second network device based on the combined synchronization signals.

In a possible design, a synchronization signal block further includes: a downlink measurement signal and/or a PBCH, and the synchronization signal block is the first synchronization signal block or the second synchronization signal block.

In a possible design, the downlink measurement signal is a configurable reference signal.

In a possible design, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

According to a sixth aspect, an embodiment of this application provides a terminal, including: a processor and a transmitter. The processor is configured to perform idle carrier sense in an uplink beam direction; and the transmitter is configured to: when idle carrier sense succeeds in the uplink beam direction, send an uplink measurement signal to a network device in the uplink beam direction.

In a possible design, there is at least one uplink beam direction, and the uplink beam direction includes a plurality of uplink beam sub-directions. Correspondingly, the sending, by the terminal, an uplink measurement signal to a network device in the uplink beam direction is specifically: sequentially sending, by the terminal, the uplink measurement signal to the network device in the plurality of uplink beam sub-directions of the uplink beam direction. Idle carrier sense is simultaneously performed in the plurality of uplink beam sub-directions, thereby reducing a quantity of times of idle carrier sense and a delay of idle carrier sense.

In a possible design, when there is one uplink beam direction, the uplink beam direction is omnidirectional.

In a possible design, the uplink beam direction is the same as a downlink beam direction corresponding to a synchronization signal received by the terminal.

According to a seventh aspect, another aspect of this application provides a computer-readable storage medium, where the computer-readable storage medium stores an instruction, and when the instruction is run on a computer, the computer is enabled to perform the method according to any one of the foregoing aspects.

According to an eighth aspect, another aspect of this application provides a computer program product including an instruction, where when running on a computer, the computer program product causes the computer to perform the method according to any one of the foregoing aspects.

BRIEF DESCRIPTION OF DRAWINGS

FIG. 1 is a flowchart of a signal transmission method according to Embodiment 1 of this application;

FIG. 2 is a schematic diagram of an SSB according to an embodiment of this application;

FIG. 3 is a flowchart of a signal transmission method according to Embodiment 2 of this application;

DESCRIPTION OF EMBODIMENTS

Figure 4:
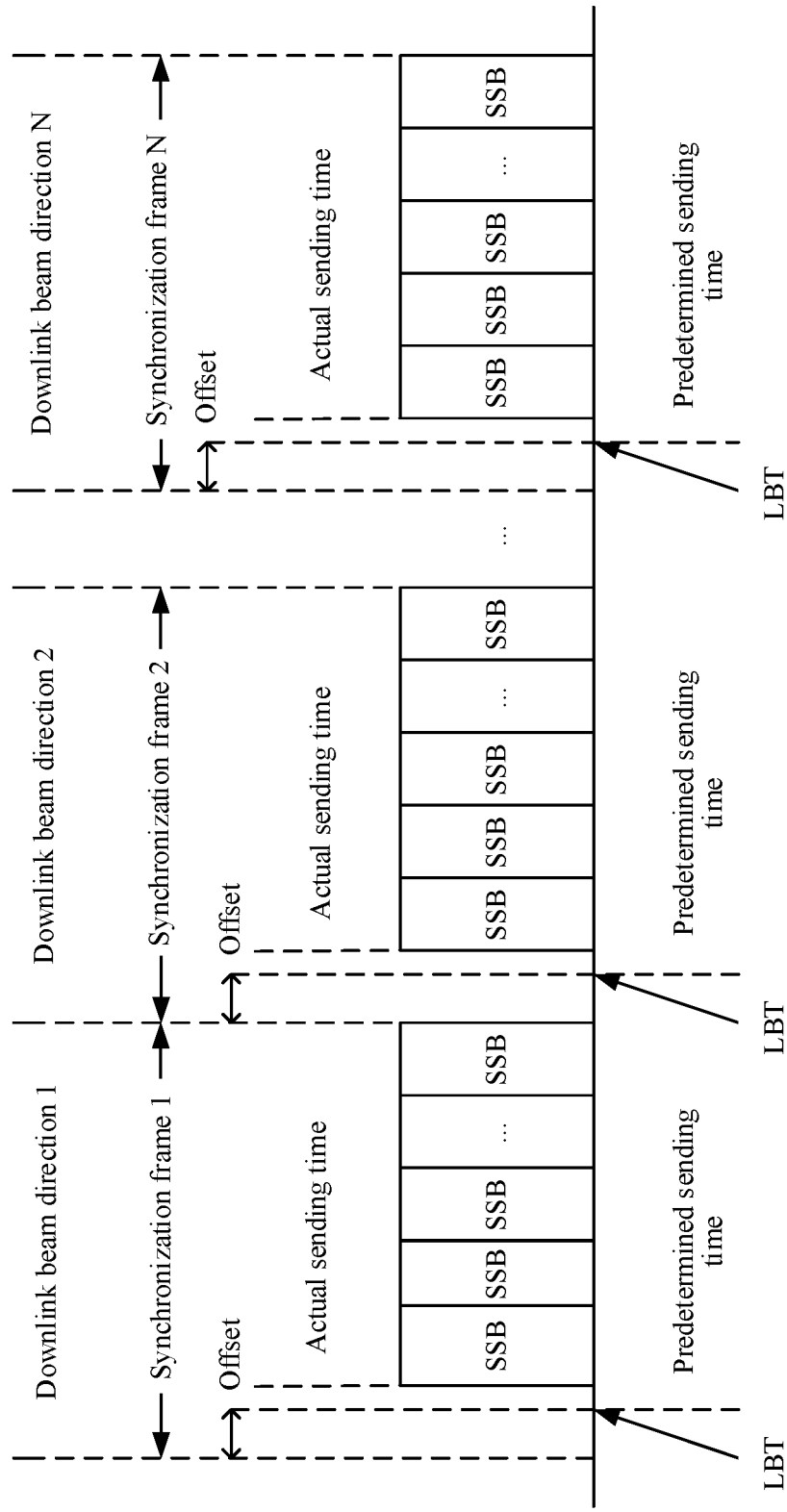
FIG. 4 is a schematic operation diagram of a signal transmission method according to an embodiment of this application.

The embodiments of this application are applied to an unlicensed (Unlicensed) high-band system. In the system, a signal is transmitted by using a plurality of directional beams. In this scenario, a network device needs to synchronize with a terminal before communication. Therefore, the network device needs to send a synchronization signal to the terminal by using directional beams in a plurality of directions, and needs to perform idle carrier sense before sending the synchronization signal. The network device needs to perform idle carrier sense in the directions of the directional beams before sending the synchronization signal by using the directional beams. The embodiments of this application provide a solution for performing idle carrier sense in a beam direction.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In the following, some terms in this application are described, to help persons skilled in the art have a better understanding.

A network device also referred to as radio access network (Radio Access Network, RAN) device and is a device connecting a terminal to a radio network. The network device may be a base transceiver station (Base Transceiver Station, BTS) in a global system for mobile communications (Global System for Mobile communications, GSM) or code division multiple access (Code Division Multiple Access, CDMA); or may be a NodeB (NodeB, NB) in wideband code division multiple access (Wideband Code Division Multiple Access, WCDMA); or may further be an evolved NodeB (evolved Node B, eNB or eNodeB) in long term evolution (Long Term Evolution, LTE), a relay station or an access point, a base station in a 5G network, or the like and is not limited herein.

A terminal may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (Personal Communication Service, PCS) phone, a cordless telephone, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), or a user device (User Device or User Equipment), and is not limited thereto.

FIG. 1 is a flowchart of a signal transmission method according to Embodiment 1 of this application. As shown in FIG. 1, the method of this embodiment includes:

S101: When a predefined sending time of each synchronization frame (Synchronization Signal burst) in a synchronization frame set (Synchronization Signal burst set) arrives, a network device performs idle carrier sense in a downlink beam direction, where the synchronization frame set includes N synchronization frames, and each of the synchronization frames includes at least one synchronization signal block (Synchronization Signal block, SSB).

S102: The network device sends a synchronization signal block to a terminal in the downlink beam direction in a synchronization frame in which idle carrier sense succeeds, where the synchronization signal block includes a synchronization signal.

Idle carrier sense is, for example, listen before talk (listen before talk, LBT).

In this embodiment, the synchronization signal is transmitted on the synchronization signal block, one synchronization frame includes at least one synchronization signal block; all synchronization frames including synchronization signals form a synchronization frame set, the synchronization frame set includes N synchronization frames, and N is an integer greater than or equal to 1. It should be noted that each synchronization frame may include a same quantity or different quantities of synchronization signal blocks. This is not limited in this embodiment. In addition, each synchronization frame is provided with a predefined sending time, and when the predefined sending time arrives, the network device needs to send the synchronization signal block only after performing idle carrier sense. Therefore, when the predefined sending time of each synchronization frame in the synchronization frame set arrives, the network device performs idle carrier sense in the downlink beam direction, to sense whether the downlink beam direction is idle. When sensing that the downlink beam direction is idle, it indicates that idle carrier sense succeeds. When sensing that the downlink beam direction is not idle, it indicates that idle carrier sense fails. For how to perform a process of idle carrier sense, refer to related descriptions in the prior art, and details are not described herein again. When idle carrier sense performed when the predefined sending time of the synchronization frame arrives succeeds, the network device sends the synchronization signal block to the terminal in the downlink beam direction in the synchronization frame in which idle carrier sense succeeds. For the predefined sending time, further refer to related descriptions in embodiments shown in FIG. 3 to FIG. 8.

Correspondingly, the terminal receives the synchronization signal block sent by the network device in the downlink beam direction. The terminal synchronizes with the network device based on the synchronization signal in the synchronization signal block.

In this embodiment, idle carrier sense is performed in the downlink beam direction when the predefined sending time of each synchronization frame arrives, and the synchronization signal block including the synchronization signal is sent in the downlink beam direction in the synchronization frame in which idle carrier sense succeeds, to perform idle carrier sense in the downlink beam direction in an unlicensed high-band system.

Optionally, the synchronization signal block further includes a downlink measurement signal. The downlink measurement signal is a configurable reference signal, for example, a UE-specific CSI-RS. The configurable reference signal may dynamically change as a network status changes. The configurable reference signal is different from an existing cell reference signal (Cell Reference Signal, CRS). The CRS is a reference signal having a fixed time-frequency resource location. Regardless of how a network status changes, a location of the CRS is fixed and does not change. However, if the terminal in a cell does not need to perform measurement, because the location of the CRS is fixed, the network device still sends the CRS, resulting in relatively high overheads of the network device and resource waste. However, in this embodiment, the downlink measurement signal is a reference signal that may be configured for the terminal by using RRC signaling, and has a location that is not fixed. Therefore, when sending the downlink measurement signal, the network device may flexibly operate, thereby avoiding a problem of high overheads of the network device and saving network resources.

Alternatively, optionally, the synchronization signal block further includes a physical broadcast channel (Physical Broadcast Channel, PBCH). The PBCH may include time index indication information, and/or information about a quantity of synchronization signal blocks (Synchronization Signal block, SSB) included in the synchronization frame. A time index is used to indicate a corresponding time location of the synchronization signal block in the synchronization frame. Specifically, the time location may be a corresponding symbol index of the SS block in the synchronization frame, or may be an offset of idle carrier sense in the SSB plus a corresponding SSB number in the synchronization frame. Optionally, the PBCH may further include a subframe or slot number of the synchronization signal block. It should be noted that this embodiment is not limited thereto.

Optionally, the synchronization signal block further includes a downlink measurement signal and a PBCH. Optionally, FIG. 2 is a schematic diagram of an SSB according to an embodiment of this application. As shown in FIG. 2, the SSB includes a synchronization signal, a PBCH, and a downlink measurement signal. The synchronization signal includes a primary synchronization signal (Primary Synchronization Signal, PSS)/a secondary synchronization signal (Secondary Synchronization Signal, SSS). The downlink measurement signal includes, for example, a CSI-RS. Optionally, the SSB may further include an optional item. This is not limited in this embodiment.

Correspondingly, after synchronizing with the network device, the terminal may further perform measurement based on the synchronization signal or the downlink measurement signal in the synchronization signal block. For how the terminal performs measurement based on the synchronization signal or the downlink measurement signal, refer to related descriptions in the prior art, and details are not described herein again.

FIG. 3 is a flowchart of a signal transmission method according to Embodiment 2 of this application. As shown in FIG. 3, this embodiment describes an implementation of Embodiment 1 of this application in detail. The method in this embodiment includes the following steps.

S201: The synchronization signal block in each synchronization frame corresponds to a same downlink beam direction, each of the N synchronization frames corresponds to a different downlink beam direction, and each synchronization frame has a predefined sending time. When the predefined sending time of each synchronization frame arrives, the network device performs idle carrier sense once in a downlink beam direction corresponding to the synchronization frame.

S202: In the synchronization frame in which idle carrier sense succeeds, the network device sends a plurality of synchronization signal blocks in the downlink beam direction corresponding to the synchronization frame in which idle carrier sense succeeds.

In this embodiment, the synchronization frame set includes the N synchronization frames, and each synchronization frame corresponds to a different downlink beam direction, that is, the N synchronization frames correspond one-to-one to N different downlink beam directions. In addition, the synchronization signal block in each synchronization frame corresponds to a same downlink beam direction, and each synchronization frame has a predefined sending time. This indicates that the network device performs idle carrier sense once in each synchronization frame. Therefore, when the predefined sending time of each synchronization frame arrives, the network device performs idle carrier sense once in a downlink beam direction corresponding to the synchronization frame. In the synchronization frame in which idle carrier sense succeeds, the network device sends the plurality of synchronization signal blocks in the downlink beam direction corresponding to the synchronization frame, that is, sends all synchronization signal blocks in the synchronization frame in the same downlink beam direction. In a synchronization frame in which idle carrier sense fails, the network device sends no synchronization signal block.

It should be noted that in this embodiment, because the network device starts to perform idle carrier sense at the predefined sending time, and sends the synchronization signal block after idle carrier sense succeeds, there is a time difference between an actual sending time at which the network device sends the synchronization signal block and the predefined sending time.

Idle carrier sense may be LBT, and LBT may be, for example, idle carrier sense CCA of 25 µs (that is, Cat2 LBT), or may be performed in a CCA manner (that is, Cat4 LBT) in which a backoff quantity is randomly selected in a backoff window. If the network device succeeds in idle carrier sense, that is, succeeds in contending for a channel, but a symbol boundary has not arrived, the network device may send a reservation signal (reservation signal) to reserve a channel before the symbol boundary arrives. Therefore, a time difference between the actual sending time of the synchronization signal block and the predefined sending time is one symbol.

FIG. 4 is a schematic operation diagram of a signal transmission method according to an embodiment of this application. As shown in FIG. 4, for example, idle carrier sense is LBT. For example, a synchronization frame 1 corresponds to a downlink beam direction 1, a synchronization frame 2 corresponds to a downlink beam direction 2, . . . , and a synchronization frame N corresponds to a downlink beam direction N. When a predefined sending time of the synchronization frame 1 arrives, the network device performs LBT in the downlink beam direction 1, and if LBT succeeds, the network device sends a plurality of SSBs in the synchronization frame 1 in the downlink beam direction 1, or if LBT fails, the network device does not send a plurality of SSBs in the synchronization frame 1 in the downlink beam direction 1. Then, when a predefined sending time of the synchronization frame 2 arrives, the network device performs LBT in the downlink beam direction 2, and if LBT succeeds, the network device sends a plurality of SSBs in the synchronization frame 2 in the downlink beam direction 2, or if LBT fails, the network device does not send a plurality of SSBs in the synchronization frame 2 in the downlink beam direction 2, and so on. Then, when a predefined sending time of the synchronization frame N arrives, the network device performs LBT in the downlink beam direction N, and if LBT succeeds, the network device sends a plurality of SSBs in the synchronization frame N in the downlink beam direction N, or if LBT fails, the network device does not send a plurality of SSBs in the synchronization frame N in the downlink beam direction N. It should be noted that there may be or may not be an offset (offset) between the predefined sending time of each synchronization frame and a start time of the synchronization frame, and the offset may be zero or may not be zero. Offsets between predefined sending times of different synchronization frames may be the same or different.

The sending, by the network device, a plurality of SSBs in a downlink beam direction may be: continuously sending, by the network device, the plurality of SSBs in the downlink beam direction. It should be noted that synchronization signals in the plurality of SSBs are the same. It should be noted that quantities of SSBs sent by the network device in different synchronization frames by using the downlink beam may be the same or different.

In this embodiment, each synchronization frame corresponds to a different downlink beam direction, and when the predefined sending time of each synchronization frame arrives, the network device performs LBT once in the downlink beam direction corresponding to the synchronization frame, thereby reducing overheads of LBT.

Figure 5:
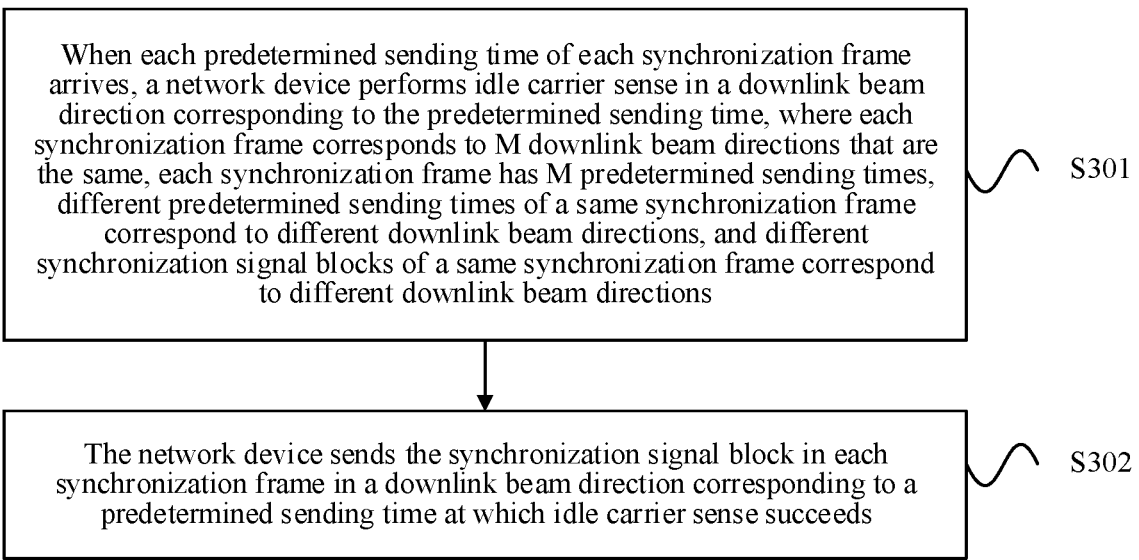
FIG. 5 is a flowchart of a signal transmission method according to Embodiment 3 of this application.

FIG. 5 is a flowchart of a signal transmission method according to Embodiment 3 of this application. As shown in FIG. 5, this embodiment describes another implementation of Embodiment 1 of this application in detail. The method in this embodiment includes the following steps.

S301: Each synchronization frame corresponds to M downlink beam directions, each synchronization frame has M predefined sending times, different predefined sending times of a same synchronization frame correspond to different downlink beam directions, and different synchronization signal blocks of a same synchronization frame correspond to different downlink beam directions. When each predefined sending time of each synchronization frame arrives, the network device performs idle carrier sense in a downlink beam direction corresponding to the predefined sending time.

S302: The network device sends the synchronization signal block in each synchronization frame in a downlink beam direction corresponding to a predefined sending time at which idle carrier sense succeeds.

In this embodiment, the synchronization frame set includes N synchronization frames, and the synchronization signal block needs to be sent in each synchronization frame in the M downlink beam directions. Correspondingly, each synchronization frame corresponds to M downlink beam directions, each synchronization frame has M predefined sending times, each predefined sending time corresponds to a different downlink beam direction, synchronization signal blocks of a same synchronization frame correspond to different downlink beam directions, and M is an integer greater than or equal to 1. Before sending the synchronization signal block in each downlink beam direction of each synchronization frame, the network device needs to perform idle carrier sense. Therefore, idle carrier sense needs to be performed for M times in each synchronization frame. Therefore, when each predefined sending time of each synchronization frame arrives, the network device performs idle carrier sense once in the downlink beam direction corresponding to the predefined sending time. In each synchronization frame, the network device sends the synchronization signal block in the downlink beam direction corresponding to the predefined sending time at which idle carrier sense succeeds, and the network device sends no synchronization signal block in the downlink beam direction corresponding to a predefined sending time at which idle carrier sense fails. It should be noted that all synchronization signal blocks in each synchronization frame are sent in different downlink beam directions.

It should be noted that in this embodiment, because the network device starts to perform idle carrier sense at the predefined sending time, and sends the synchronization signal block after idle carrier sense succeeds, there is a time difference between an actual sending time at which the network device sends the synchronization signal block and the predefined sending time. Correspondingly, there is also a time difference between sending times of every two neighboring synchronization signal blocks.

Idle carrier sense may be LBT, and LBT may be, for example, idle carrier sense CCA of 25 µs (that is, Cat2 LBT), or may be a CCA manner (that is, Cat4 LBT) in which a backoff quantity is randomly selected in a backoff window. If the network device succeeds in idle carrier sense, that is, succeeds in contending for a channel, but a symbol boundary has not arrived, the network device may send a reservation signal (reservation signal) to reserve a channel before the symbol boundary arrives. Therefore, the time difference may be one symbol.

Figure 6:
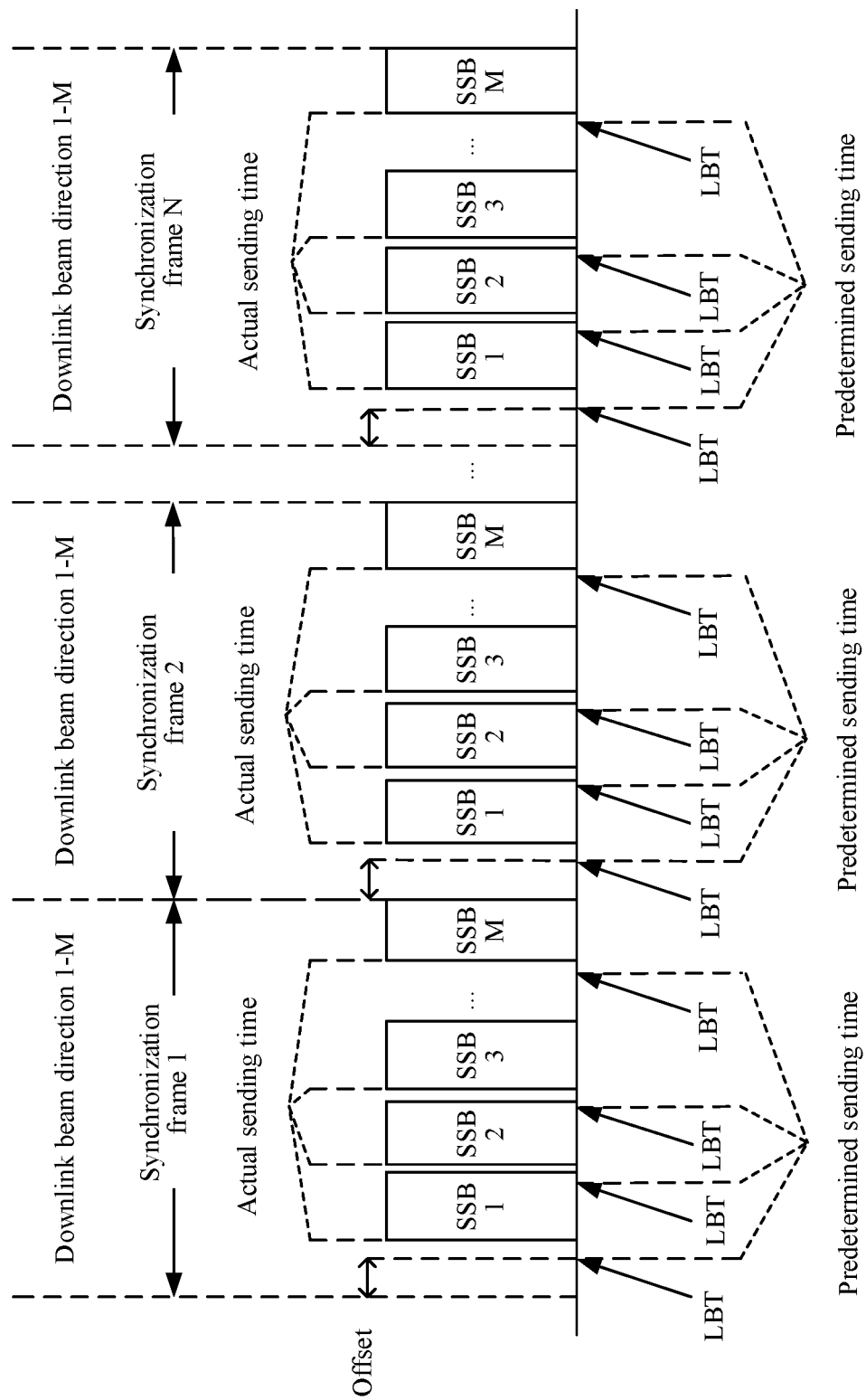
FIG. 6 is another schematic operation diagram of a signal transmission method according to an embodiment of this application.

FIG. 6 is another schematic operation diagram of a signal transmission method according to an embodiment of this application. As shown in FIG. 6, for example, idle carrier sense is LBT. For example, a synchronization frame 1 corresponds to a downlink beam direction 1-M, a synchronization frame 2 corresponds to a downlink beam direction 1-M, . . . , and a synchronization frame N corresponds to a downlink beam direction 1-M. In addition, a predefined sending time 1 of each synchronization frame corresponds to a downlink beam direction 1, a predefined sending time 2 corresponds to the downlink beam direction 2, . . . , and a predefined sending time M corresponds to a downlink beam direction M.

When the predefined sending time 1 of the synchronization frame 1 arrives, the network device performs LBT in the downlink beam direction 1, and if LBT succeeds, the network device sends an SSB in the downlink beam direction 1, or if LBT fails, the network device sends no SSB in the downlink beam direction 1. Then, when the predefined sending time 2 of the synchronization frame 1 arrives, the network device performs LBT in the downlink beam direction 2, and if LBT succeeds, the network device sends an SSB in the downlink beam direction 2, or if LBT fails, the network device sends no SSB in the downlink beam direction 2, and so on. Then, when the predefined sending time N of the synchronization frame 1 arrives, the network device performs LBT in the downlink beam direction N, and if LBT succeeds, the network device sends an SSB in the synchronization frame 1 in the downlink beam direction N, or if LBT fails, the network device sends no SSB in the synchronization frame 1 in the downlink beam direction N.

When the predefined sending time 1 of the synchronization frame 2 arrives, the network device performs LBT in the downlink beam direction 1, and if LBT succeeds, the network device sends an SSB in the synchronization frame 2 in the downlink beam direction 1, or if LBT fails, the network device sends no SSB in the synchronization frame 2 in the downlink beam direction 1. Then, when the predefined sending time 2 of the synchronization frame 2 arrives, the network device performs LBT in the downlink beam direction 2, and if LBT succeeds, the network device sends an SSB in the synchronization frame 2 in the downlink beam direction 2, or if LBT fails, the network device sends no SSB in the synchronization frame 2 in the downlink beam direction 2, and so on. Then, when the predefined sending time N of the synchronization frame 2 arrives, the network device performs LBT in the downlink beam direction N, and if LBT succeeds, the network device sends an SSB in the synchronization frame 2 in the downlink beam direction N, or if LBT fails, the network device sends no SSB in the synchronization frame 2 in the downlink beam N.

When the predefined sending time 1 of the synchronization frame N arrives, the network device performs LBT in the downlink beam direction 1, and if LBT succeeds, the network device sends an SSB in the synchronization frame N in the downlink beam direction 1, or if LBT fails, the network device sends no SSB in the synchronization frame N in the downlink beam direction 1. Then, when the predefined sending time 2 of the synchronization frame N arrives, the network device performs LBT in the downlink beam direction 2, and if LBT succeeds, the network device sends an SSB in the synchronization frame N in the downlink beam direction 2, or if LBT fails, the network device sends no SSB in the synchronization frame N in the downlink beam direction 2, and so on. Then, when the predefined sending time N of the synchronization frame N arrives, the network device performs LBT in the downlink beam direction N, and if LBT succeeds, the network device sends an SSB in the synchronization frame N in the downlink beam direction N, or if LBT fails, the network device sends no SSB in the synchronization frame N in the downlink beam direction N.

There may be or may not be an offset between a first predefined sending time of each synchronization frame and a start sending time of a corresponding synchronization signal block, and the offset may be or may not be zero. In addition, offsets corresponding to each synchronization frame may be the same or different.

Optionally, each SSB occupies a same OFDM symbol in time.

In this embodiment, each synchronization frame has a plurality of predefined sending times, and each predefined sending time corresponds to a different downlink beam direction. Therefore, the network device performs LBT in each synchronization frame in different downlink beam directions, and the synchronization signal block is sent in the plurality of downlink beam directions in each synchronization frame. Therefore, a synchronization time of the terminal and the network device is advanced and synchronization efficiency is improved.

Figure 7:
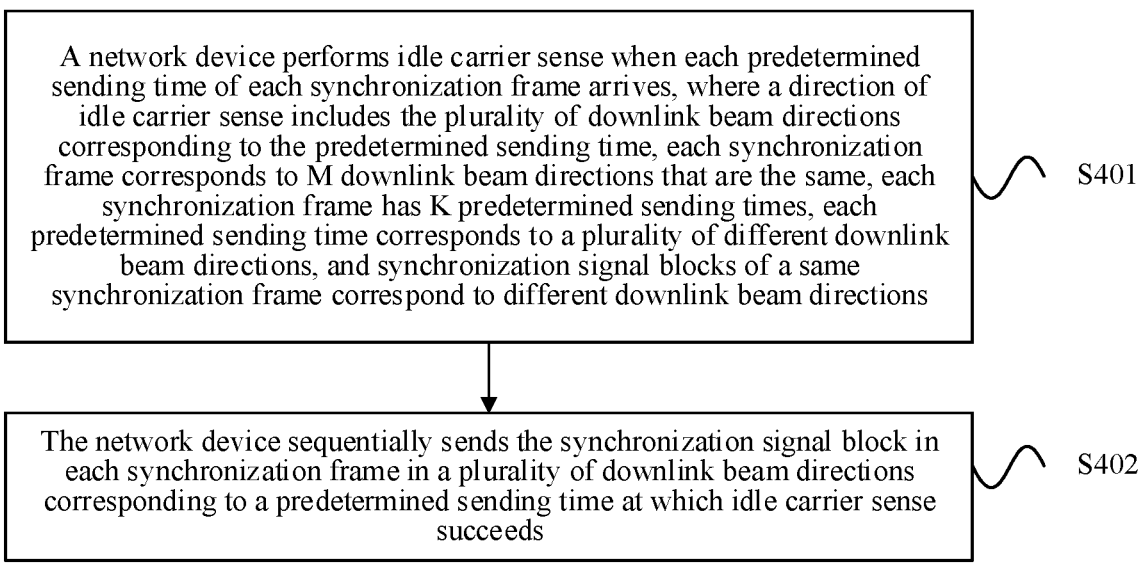
FIG. 7 is a flowchart of a signal transmission method according to Embodiment 4 of this application.

FIG. 7 is a flowchart of a signal transmission method according to Embodiment 4 of this application. As shown in FIG. 7, this embodiment describes another implementation of Embodiment 1 of this application in detail. The method in this embodiment includes the following steps.

S401: Each synchronization frame corresponds to M downlink beam directions, each synchronization frame has K predefined sending times, each predefined sending time corresponds to a plurality of different downlink beam directions, and synchronization signal blocks of a same synchronization frame correspond to different downlink beam directions. The network device performs idle carrier sense when each predefined sending time of each synchronization frame arrives, where a direction of idle carrier sense includes the plurality of downlink beam directions corresponding to the predefined sending time.

S402: The network device sequentially sends the synchronization signal block in each synchronization frame in a plurality of downlink beam directions corresponding to a predefined sending time at which idle carrier sense succeeds.

In this embodiment, the synchronization frame set includes N synchronization frames, and the synchronization signal block needs to be sent in each synchronization frame in the M downlink beam directions. Correspondingly, each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, and M is an integer greater than or equal to 1. Before sending the synchronization signal block in each downlink beam direction of each synchronization frame, the network device needs to perform idle carrier sense. Therefore, idle carrier sense needs to be performed for K times in each synchronization frame. Therefore, when each predefined sending time of each synchronization frame arrives, the network device simultaneously performs idle carrier sense once in the plurality of downlink beam directions corresponding to the predefined sending time. In each synchronization frame, the network device sends the synchronization signal block in the plurality of downlink beam directions corresponding to the predefined sending time at which idle carrier sense succeeds, and the network device sends no synchronization signal block in a plurality of downlink beam directions corresponding to a predefined sending time at which idle carrier sense fails. Optionally, the plurality of different downlink beam directions corresponding to each predefined sending time are continuous.

It should be noted that in this embodiment, because the network device starts to perform idle carrier sense at the predefined sending time, and sends the synchronization signal block after idle carrier sense succeeds, there is a time difference between an actual sending time at which the network device sends the synchronization signal block and the predefined sending time.

Idle carrier sense may be LBT, and LBT may be, for example, idle carrier sense CCA of 25 μs (that is, Cat2 LBT), or may be a CCA manner (that is, Cat4 LBT) in which a backoff quantity is randomly selected in a backoff window. If the network device succeeds in idle carrier sense, that is, succeeds in contending for a channel, but a symbol boundary has not arrived, the network device may send a reservation signal (reservation signal) to reserve a channel before the symbol boundary arrives. Therefore, the time difference may be one symbol.

Figure 8:
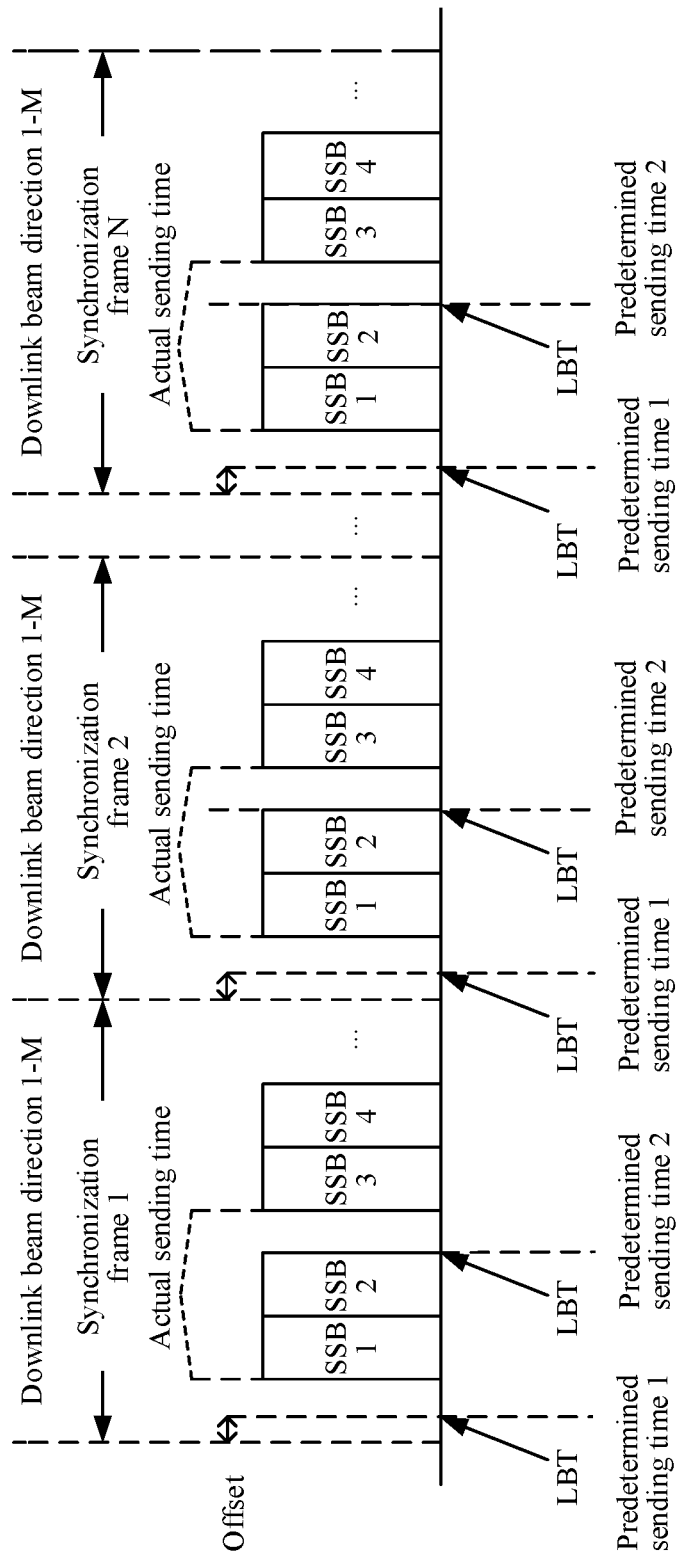
FIG. 8 is another schematic operation diagram of a signal transmission method according to an embodiment of this application.

FIG. 8 is another schematic operation diagram of a signal transmission method according to an embodiment of this application. As shown in FIG. 8, for example, idle carrier sense is LBT. In addition, each predefined sending time corresponds to two downlink beam directions. For example, a synchronization frame 1 corresponds to a downlink beam direction 1-M, a synchronization frame 2 corresponds to a downlink beam direction 1-M, . . . , and a synchronization frame N corresponds to a downlink beam direction 1-M. In addition, a predefined sending time 1 of each synchronization frame corresponds to downlink beam directions 1 and 2, a predefined sending time 2 corresponds to downlink beam directions 3 and 4, and so on.

When the predefined sending time 1 of the synchronization frame 1 arrives, the network device performs LBT once in the downlink beam directions 1 and 2, where directions of LBT include the downlink beam directions 1 and 2; and if LBT succeeds, the network device sends an SSB in the downlink beam direction 1 and then sends an SSB in the downlink beam direction 2, or if LBT fails, the network device sends no SSB in the downlink beam direction 1 and sends no SSB in the downlink beam direction 2 either. Then, when the predefined sending time 2 of the synchronization frame 1 arrives, the network device performs LBT in the downlink beam directions 3 and 4, where directions of LBT include the downlink beam directions 3 and 4, and if LBT succeeds, the network device sends an SSB in the downlink beam direction 3 and then sends an SSB in the downlink beam direction 4, or if LBT fails, the network device sends no SSB in the downlink beam direction 3 and sends no SSB in the downlink beam direction 4 either, and so on. Details are not described again.

When the predefined sending time 1 of the synchronization frame 2 arrives, the network device performs LBT once in the downlink beam directions 1 and 2, and if LBT succeeds, the network device sends an SSB in the downlink beam direction 1 and then sends an SSB in the downlink beam direction 2, or if LBT fails, the network device sends no SSB in the downlink beam direction 1 and sends no SSB in the downlink beam direction 2 either. Then, when the predefined sending time 2 of the synchronization frame 2 arrives, the network device performs LBT once in the downlink beam directions 3 and 4, and if LBT succeeds, the network device sends an SSB in the downlink beam direction 3 and then sends an SSB in the downlink beam direction 4, or if LBT fails, the network device sends no SSB in the downlink beam direction 3 and sends no SSB in the downlink beam direction 4 either, and so on. Details are not described again.

When the predefined sending time 1 of the synchronization frame N arrives, the network device performs LBT once in the downlink beam directions 1 and 2, and if LBT succeeds, the network device sends an SSB in the downlink beam direction 1 and then sends an SSB in the downlink beam direction 2, or if LBT fails, the network device sends no SSB in the downlink beam direction 1 and sends no SSB in the downlink beam direction 2 either. Then, when the predefined sending time 2 of the synchronization frame N arrives, the network device performs LBT once in the downlink beam directions 3 and 4, and if LBT succeeds, the network device sends an SSB in the downlink beam direction 3 and then sends an SSB in the downlink beam direction 4, or if LBT fails, the network device sends no SSB in the downlink beam direction 3 and sends no SSB in the downlink beam direction 4 either, and so on. Details are not described again.

There may be or may not be an offset between a first predefined sending time of each synchronization frame and a start sending time of a first synchronization signal block of a plurality of corresponding synchronization signal blocks, and the offset may be or may not be zero. In addition, offsets corresponding to each synchronization frame may be the same or different.

Optionally, each SSB occupies a same OFDM symbol in time.

In this embodiment, each synchronization frame has the plurality of predefined sending times, and each predefined sending time corresponds to the plurality of different downlink beam directions. Therefore, the network device performs only LBT in each synchronization frame in the plurality of different downlink beam directions, thereby reducing overheads of LBT. In addition, a synchronization time of the terminal and the network device is advanced and synchronization efficiency is improved.

Optionally, the network device may further send, on a broadcast channel to the terminal, a start time (that is, the predefined sending time) at which the network device performs idle carrier sense. After receiving the start time of idle carrier sense that is sent by the network device, the terminal determines a receiving time of an SSB based on the start time, and receives, based on the receiving time, an SSB sent by the network device.

Optionally, a plurality of network devices may belong to a same cell. The network devices belonging to the same cell means that the network devices are managed by a same central controller. The network devices belonging to the same cell send an SSB at a same time in a same downlink beam direction. Optionally, the network devices belonging to the same cell perform idle carrier sense at a same start time. In this way, when idle carrier sense succeeds, the plurality of network devices send an SSB to the terminal at a same time. For how each network device performs idle carrier sense in a synchronization frame in a downlink beam direction, and an implementation process of sending an SSB in the downlink beam direction when idle carrier sense succeeds, refer to related descriptions in the foregoing embodiments. Details are not described herein again. Correspondingly, the terminal may receive SSBs sent by the plurality of network devices in the same downlink beam direction, and the terminal then combines all the synchronization signals, and synchronizes with each network device based on the combined synchronization signals. Therefore, in this embodiment, each network device sends an SSB at a same time, so that the terminal may receive a plurality of SSBs in a same beam direction at a same time, thereby obtaining combining gains of the SSBs.

Figure 9:
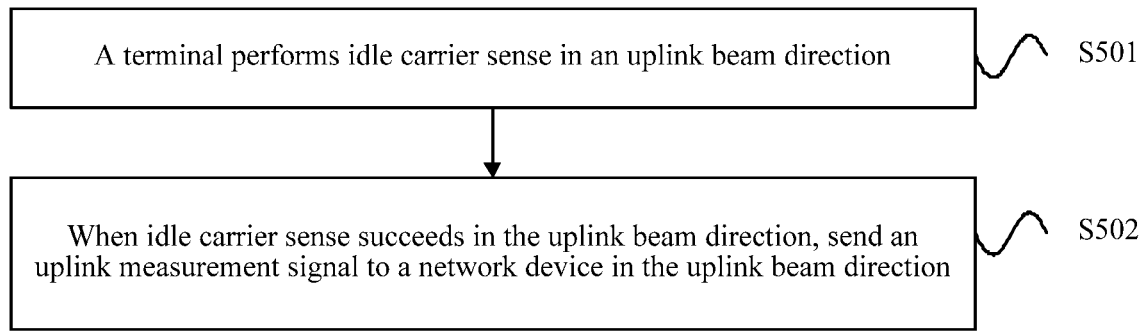
FIG. 9 is a flowchart of a signal transmission method according to Embodiment 5 of this application.

FIG. 9 is a flowchart of a signal transmission method according to Embodiment 5 of this application. As shown in FIG. 9, the method of this embodiment may include:

S501: A terminal performs idle carrier sense in an uplink beam direction.

S502: When idle carrier sense succeeds in the uplink beam direction, send an uplink measurement signal to a network device in the uplink beam direction.

This embodiment is applied to an unlicensed (Unlicensed) high-band system. In the system, a signal is transmitted by using a beam, and there are multiple beams (multiple beams). In this scenario, the terminal needs to send the uplink measurement signal to the network device in the uplink beam direction. Therefore, the terminal performs idle carrier sense in the uplink beam direction before sending the uplink measurement signal. When idle carrier sense succeeds, the terminal sends the uplink measurement signal to the network device in the uplink beam direction. Correspondingly, the network device receives the uplink measurement signal sent by the terminal in the uplink beam direction, and performs measurement based on the uplink measurement signal. Idle carrier sense is, for example, LBT.

In a feasible implementation, there is at least one uplink beam direction, and the uplink beam direction includes a plurality of uplink beam sub-directions. The sending an uplink measurement signal to a network device in the uplink beam direction includes: sequentially sending the uplink measurement signal to the network device in the plurality of uplink beam sub-directions of the uplink beam direction. Optionally, the uplink measurement signals sent in the different uplink beam sub-directions belonging to the same uplink beam direction are carried in different OFDM symbols. In this embodiment, because idle carrier sense is simultaneously performed in the plurality of uplink beam sub-directions, a quantity of times of idle carrier sense and a delay of idle carrier sense can be reduced.

The plurality of uplink beam sub-directions belonging to the same uplink beam direction are continuous. For example, based on beam directivity, directions may be sequentially divided into an uplink beam sub-direction 1, an uplink beam sub-direction 2, an uplink beam sub-direction 3, . . . , and an uplink beam sub-direction H, where H is an integer greater than 1. The uplink beam sub-directions 1 to 3 form an uplink beam direction 1, the uplink beam sub-directions 4 to 6 form an uplink beam direction 2, and the uplink beam sub-directions H-2 to H form an uplink beam direction L.

The terminal performs idle carrier sense in the uplink beam direction 1, and if idle carrier sense succeeds, the terminal sends the uplink measurement signal in the uplink beam 1. This is equivalent to that the terminal simultaneously performs idle carrier sense in the uplink beam sub-directions 1 to 3, and when idle carrier sense succeeds, the terminal simultaneously sends the uplink measurement signal in the uplink beam sub-directions 1 to 3. Then, the terminal performs idle carrier sense in the uplink beam direction 2, and if idle carrier sense succeeds, the terminal sends the uplink measurement signal in the uplink beam direction 2. This is equivalent to that the terminal simultaneously performs idle carrier sense in the uplink beam sub-directions 4 to 6, and when idle carrier sense succeeds, the terminal simultaneously sends the uplink measurement signal in the uplink beam sub-directions 1 to 3, and so on. Then, the terminal performs idle carrier sense in the uplink beam direction L, and if idle carrier sense succeeds, the terminal sends the uplink measurement signal in the uplink beam direction L. This is equivalent to that the terminal simultaneously performs idle carrier sense in the uplink beam sub-directions H-2 to H, and when idle carrier sense succeeds, the terminal simultaneously sends the uplink measurement signal in the uplink beam sub-directions H-2 to H.

Optionally, the uplink measurement signal sent in the uplink beam sub-direction 1, the uplink measurement signal sent in the uplink beam sub-direction 2, and the uplink measurement signal sent in the uplink beam sub-direction 3 are separately carried on different OFDM symbols.

It should be noted that in this embodiment, an uplink beam sub-direction may be an uplink beam direction in the prior art. Correspondingly, in this embodiment, the uplink beam direction is a wide beam direction including a plurality of uplink beam directions in the prior art.

In a feasible implementation, when there is one uplink beam direction, the uplink beam direction is an omnidirectional uplink beam direction. In this case, it may be considered that there is one uplink beam direction and the uplink beam direction is 360 degrees. Then, the terminal performs idle carrier sense in the omnidirectional uplink beam direction, and when idle carrier sense succeeds, the terminal sends the uplink measurement signal in the omnidirectional uplink beam direction.

In a feasible implementation, the uplink beam direction is the same as a corresponding downlink beam direction in which the terminal receives a synchronization signal. In this embodiment, before performing idle carrier sense in the uplink beam direction, the terminal needs to complete synchronization with the network device. Therefore, the terminal receives the synchronization signal, where the synchronization signal is sent by the network device in the downlink beam direction. The terminal receives at least one synchronization signal, where the at least one synchronization signal may be sent by the network device in different downlink beams. Therefore, the terminal chooses to perform idle carrier sense in the uplink beam direction that is the same as the downlink beam direction corresponding to the synchronization signal, and does not need to perform idle carrier sense in all uplink beam directions. This may reduce a quantity of uplink beam directions in which idle carrier sense is performed, improves efficiency of measuring and tracing the terminal by the network device, and may reduce power consumption of the terminal.

For example, the terminal receives the synchronization signal sent by the network device in the downlink beam direction 3, further receives the synchronization signal sent by the network device in the downlink beam direction 6, and further receives the synchronization signal sent by the network device in the downlink beam direction 9. In addition, the downlink beam direction 3 corresponds to the uplink beam direction 3, the downlink beam direction 6 is corresponds to the uplink beam direction 6, and the downlink beam direction 9 corresponds to the uplink beam direction 9. Therefore, the terminal performs idle carrier sense in the uplink beam direction 3, performs idle carrier sense in the uplink beam direction 6, and performs idle carrier sense in the uplink beam direction 9, and does not need to perform idle carrier sense in another uplink beam direction.

Figure 10:
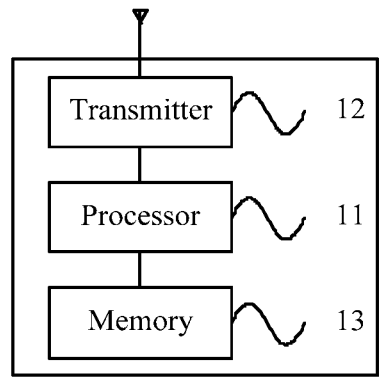
FIG. 10 is a schematic structural diagram of a network device according to Embodiment 1 of this application.

FIG. 10 is a schematic structural diagram of a network device according to Embodiment 1 of this application. As shown in FIG. 10, the network device in this embodiment may include: a processor 11 and a transmitter 12, where the processor 11 is configured to: when a predefined sending time of each synchronization frame in a synchronization frame set arrives, perform idle carrier sense in a downlink beam direction, where the synchronization frame set includes N synchronization frames, N is a positive integer, and each synchronization frame includes at least one synchronization signal block; and the transmitter 12 is configured to send a synchronization signal block to a terminal in the downlink beam direction in a synchronization frame in which idle carrier sense succeeds, where the synchronization signal block includes a synchronization signal.

In a possible implementation, the synchronization signal block in each synchronization frame corresponds to a same downlink beam direction, each of the N synchronization frames corresponds to a different downlink beam direction, and each synchronization frame has a predefined sending time;

the processor 11 is specifically configured to: when the predefined sending time of each synchronization frame arrives, perform idle carrier sense in a downlink beam direction corresponding to the synchronization frame; and the transmitter 12 is specifically configured to: in the synchronization frame in which idle carrier sense succeeds, send a plurality of synchronization signal blocks in the downlink beam direction corresponding to the synchronization frame in which idle carrier sense succeeds.

In a possible implementation, each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than or equal to 1;

the processor 11 is specifically configured to: when each predefined sending time of each synchronization frame arrives, perform idle carrier sense in a downlink beam direction corresponding to the predefined sending time; and the transmitter 12 is specifically configured to: in each synchronization frame, send the synchronization signal block in a downlink beam direction corresponding to a predefined sending time at which idle carrier sense succeeds.

In a possible implementation, each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, M is an integer greater than or equal to 1, and K is an integer greater than or equal to 1;

the processor 11 is specifically configured to perform idle carrier sense once when each predefined sending time of each synchronization frame arrives, where a direction of the idle carrier sense includes the plurality of downlink beam directions corresponding to the predefined sending time; and the transmitter 12 is specifically configured to: in each synchronization frame, sequentially send the synchronization signal block in a plurality of downlink beam directions corresponding to a predefined sending time at which idle carrier sense succeeds.

Optionally, the synchronization signal block further includes: a downlink measurement signal and/or a PBCH.

Optionally, the downlink measurement signal is a configurable reference signal.

Optionally, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

Optionally, the first network device and a second network device perform idle carrier sense at a same start time, and the second network device is any network device that belongs to a same cell as the first network device.

It should be noted that the transmitter 12 may be a device, or the transmitter 12 and a receiver are integrated to form a transceiver.

Optionally, the network device in this embodiment may further include a memory 13, where the memory 13 is configured to store program code of the foregoing signal transmission method.

The network device in this embodiment may be configured to perform the technical solutions of the network device in any one of the method embodiments shown in FIG. 1 to FIG. 8. Their implementation principles and technical effects are similar, and details are not described herein again.

Figure 11:
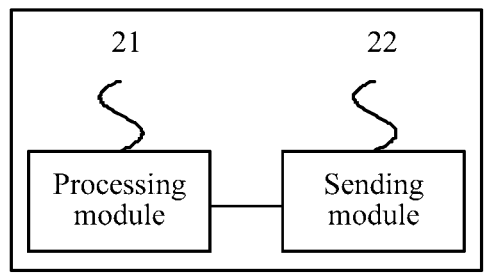
FIG. 11 is a schematic structural diagram of a network device according to Embodiment 2 of this application.

FIG. 11 is a schematic structural diagram of a network device according to Embodiment 2 of this application. As shown in FIG. 11, the network device in this embodiment may include: a processing module 21 and a sending module 22, where the processing module 21 is configured to: when a predefined sending time of each synchronization frame in a synchronization frame set arrives, perform idle carrier sense in a downlink beam direction, where the synchronization frame set includes N synchronization frames, N is a positive integer, and each synchronization frame includes at least one synchronization signal block; and the sending module 22 is configured to send a synchronization signal block to a terminal in the downlink beam direction in a synchronization frame in which idle carrier sense succeeds, where the synchronization signal block includes a synchronization signal.

In a possible implementation, the synchronization signal block in each synchronization frame corresponds to a same downlink beam direction, each of the N synchronization frames corresponds to a different downlink beam direction, and each synchronization frame has a predefined sending time;

the processing module 21 is specifically configured to: when the predefined sending time of each synchronization frame arrives, perform idle carrier sense in a downlink beam direction corresponding to the synchronization frame; and the sending module 22 is specifically configured to: in the synchronization frame in which idle carrier sense succeeds, send a plurality of synchronization signal blocks in the downlink beam direction corresponding to the synchronization frame in which idle carrier sense succeeds.

In a possible implementation, each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than or equal to 1;

the processing module 21 is specifically configured to: when each predefined sending time of each synchronization frame arrives, perform idle carrier sense in a downlink beam direction corresponding to the predefined sending time; and the sending module 22 is specifically configured to: in each synchronization frame, send the synchronization signal block in a downlink beam direction corresponding to a predefined sending time at which idle carrier sense succeeds.

In a possible implementation, each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, M is an integer greater than or equal to 1, and K is an integer greater than or equal to 1;

the processing module 21 is specifically configured to perform idle carrier sense when each predefined sending time of each synchronization frame arrives, where a direction of the idle carrier sense includes the plurality of downlink beam directions corresponding to the predefined sending time; and the sending module 22 is specifically configured to: in each synchronization frame, sequentially send the synchronization signal block in a plurality of downlink beam directions corresponding to a predefined sending time at which idle carrier sense succeeds.

Optionally, the synchronization signal block further includes: a downlink measurement signal and/or a PBCH.

Optionally, the downlink measurement signal is a configurable reference signal.

Optionally, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

Optionally, the first network device and a second network device perform idle carrier sense at a same start time, and the second network device is any network device that belongs to a same cell as the first network device.

The network device in this embodiment may be configured to perform the technical solutions of the network device in any one of the method embodiments shown in FIG. 1 to FIG. 8. Their implementation principles and technical effects are similar, and details are not described herein again.

Figure 12:
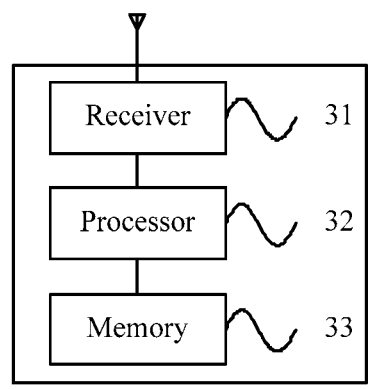
FIG. 12 is a schematic structural diagram of a terminal according to Embodiment 1 of this application.

FIG. 12 is a schematic structural diagram of a terminal according to Embodiment 1 of this application. As shown in FIG. 12, the terminal in this embodiment may include: a receiver 31 and a processor 32, where the receiver 31 is specifically configured to receive a first synchronization signal block sent by a first network device in a downlink beam direction, where the first synchronization signal block includes a first synchronization signal; and the processor 32 is specifically configured to synchronize with the first network device based on the first synchronization signal.

Optionally, the receiver 31 is further configured to receive a second synchronization signal block sent by a second network device in the downlink beam direction, where the second synchronization signal block includes a second synchronization signal; and the processor 32 is specifically configured to: combine the first synchronization signal sent by the first network device and the second synchronization signal sent by the second network device, to obtain combined synchronization signals; synchronize with the first network device based on the combined synchronization signals; and synchronize with the second network device based on the combined synchronization signals.

Optionally, a synchronization signal block further includes: a downlink measurement signal and/or a PBCH, and the synchronization signal block is the first synchronization signal block or the second synchronization signal block.

Optionally, the downlink measurement signal is a configurable reference signal.

Optionally, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

It should be noted that the receiver 31 may be a device, or the receiver 31 and a transmitter are integrated to form a transceiver.

Optionally, the network device in this embodiment may further include a memory 33, where the memory 33 is configured to store program code of the foregoing signal transmission method.

The terminal in this embodiment may be configured to perform the technical solutions of the terminal in any one of the method embodiments shown in FIG. 1 to FIG. 8. Their implementation principles and technical effects are similar, and details are not described herein again.

Figure 13:
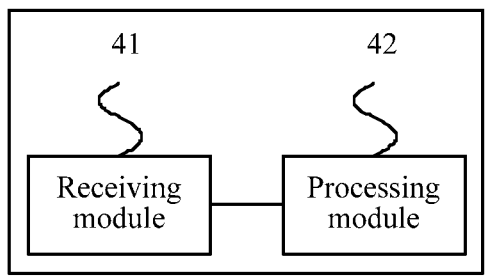
FIG. 13 is a schematic structural diagram of a terminal according to Embodiment 2 of this application.

FIG. 13 is a schematic structural diagram of a terminal according to Embodiment 2 of this application. As shown in FIG. 13, the terminal in this embodiment may include: a receiving module 41 and a processing module 42, where the receiving module 41 is specifically configured to receive a first synchronization signal block sent by a first network device in a downlink beam direction, where the first synchronization signal block includes a first synchronization signal; and the processing module 42 is specifically configured to synchronize with the first network device based on the first synchronization signal.

Optionally, the receiving module 41 is further configured to receive a second synchronization signal block sent by a second network device in the downlink beam direction, where the second synchronization signal block includes a second synchronization signal; and the processing module 42 is specifically configured to: combine the first synchronization signal sent by the first network device and the second synchronization signal sent by the second network device, to obtain combined synchronization signals; synchronize with the first network device based on the combined synchronization signals; and synchronize with the second network device based on the combined synchronization signals.

Optionally, a synchronization signal block further includes: a downlink measurement signal and/or a PBCH, and the synchronization signal block is the first synchronization signal block or the second synchronization signal block.

Optionally, the downlink measurement signal is a configurable reference signal.

Optionally, the PBCH includes: time indication information, and/or information about a quantity of synchronization signal blocks included in a synchronization frame to which the PBCH belongs, where the time indication information is used to indicate a corresponding time location of a synchronization signal block to which the PBCH belongs in the synchronization frame.

Figure 14:
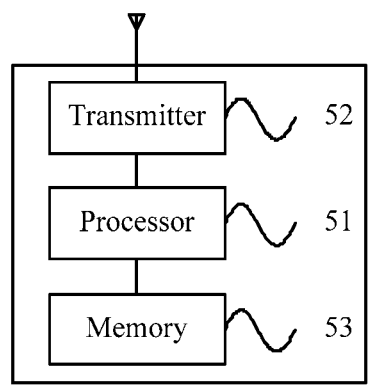
FIG. 14 is a schematic structural diagram of a terminal according to Embodiment 3 of this application.

The terminal in this embodiment may be configured to perform the technical solutions of the terminal in any one of the method embodiments shown in FIG. 1 to FIG. 8. Their implementation principles and technical effects are similar, and details are not described herein again.

FIG. 14 is a schematic structural diagram of a terminal according to Embodiment 3 of this application. As shown in FIG. 14, the terminal in this embodiment may include: a processor 51 and a transmitter 52.

The processor 51 is configured to perform idle carrier sense in an uplink beam direction.

The transmitter 52 is configured to: when idle carrier sense succeeds in the uplink beam direction, send an uplink measurement signal to a network device in the uplink beam direction.

Optionally, there is at least one uplink beam direction, and the uplink beam direction includes a plurality of uplink beam sub-directions. Correspondingly, the sending an uplink measurement signal to a network device in the uplink beam direction includes: sequentially sending the uplink measurement signal to the network device in the plurality of uplink beam sub-directions of the uplink beam direction.

Optionally, when there is one uplink beam direction, the uplink beam direction is omnidirectional.

Optionally, the uplink beam direction is the same as a direction of the downlink beam direction corresponding to a synchronization signal received by the terminal.

It should be noted that the transmitter 52 may be a device, or the transmitter 52 and a receiver are integrated to form a transceiver.

Optionally, the network device in this embodiment may further include a memory 53, where the memory 53 is configured to store program code of the foregoing signal transmission method.

The terminal in this embodiment may be configured to perform the technical solutions of the terminal in the method embodiment shown in FIG. 9. Their implementation principles and technical effects are similar, and details are not described herein again.

Figure 15:
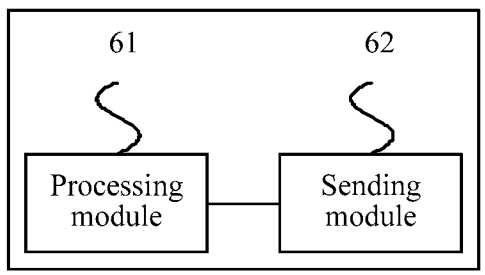
FIG. 15 is a schematic structural diagram of a terminal according to Embodiment 4 of this application.

FIG. 15 is a schematic structural diagram of a terminal according to Embodiment 4 of this application. As shown in FIG. 15, the terminal in this embodiment may include: a processing module 61 and a sending module 62.

The processing module 61 is configured to perform idle carrier sense in an uplink beam direction.

The sending module 62 is configured to: when idle carrier sense succeeds in the uplink beam direction, send an uplink measurement signal to a network device in the uplink beam direction.

Optionally, there is at least one uplink beam direction, and the uplink beam direction includes a plurality of uplink beam sub-directions. Correspondingly, the sending an uplink measurement signal to a network device in the uplink beam direction includes: sequentially sending the uplink measurement signal to the network device in the plurality of uplink beam sub-directions of the uplink beam direction.

Optionally, when there is one uplink beam direction, the uplink beam direction is omnidirectional.

Optionally, the uplink beam direction is the same as a downlink beam direction corresponding to a synchronization signal received by the terminal.

The terminal in this embodiment may be configured to perform the technical solutions of the terminal in the method embodiment shown in FIG. 9. Their implementation principles and technical effects are similar, and details are not described herein again.

The processor 11, the processor 32, and the processor 51 may be a general-purpose processor (CPU), a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

What is claimed is:

1. A signal transmission method, comprising: performing, by a network device, idle carrier sense in a downlink beam direction when a predefined sending time of each synchronization frame in a synchronization frame set arrives, wherein the synchronization frame set comprises N synchronization frames, N is a positive integer, and each synchronization frame comprises at least one synchronization signal block; and sending a synchronization signal block in a synchronization frame in which idle carrier sense succeeds to a terminal in the downlink beam direction, wherein the synchronization signal block comprises a synchronization signal, wherein each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than 1; the performing, by a network device, of idle carrier sense in a downlink beam direction when a predefined sending time of each synchronization frame in a synchronization frame set arrives comprises: when each predefined sending time of each synchronization frame arrives, performing idle carrier sense in a downlink beam direction corresponding to the predefined sending time; and the sending of a synchronization signal block to a terminal in the downlink beam direction in a synchronization frame in which idle carrier sense succeeds comprises: in each synchronization frame, sending the synchronization signal block in a downlink beam direction corresponding to a predefined sending time at which idle carrier sense succeeds.

2. The method according to claim 1, wherein the synchronization signal block in each synchronization frame corresponds to a same downlink beam direction, each of the N synchronization frames corresponds to a different downlink beam direction, and each synchronization frame has a predefined sending time; the performing, by a network device, of idle carrier sense in a downlink beam direction when a predefined sending time of each synchronization frame in a synchronization frame set arrives comprises: when the predefined sendingtime of each synchronization frame arrives, performing, by the network device, idle carrier sense in the downlink beam direction corresponding to the synchronization frame; and the sending of a synchronization signal block to a terminal in the downlink beam direction in a synchronization frame in which idle carrier sense succeeds comprises: in the synchronization frame in which idle carrier sense succeeds, sending a plurality of synchronization signal blocks in the downlink beam direction corresponding to the synchronization frame in which idle carrier sense succeeds.

3. The method according to claim 1, wherein each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, and K is an integer greater than or equal to 1; the performing, by a network device, of idle carrier sense in a downlink beam direction when a predefined sending time of each synchronization frame in a synchronization frame set arrives comprises: performing idle carrier sense when each predefined sending time of each synchronization frame arrives in the plurality of downlink beam directions corresponding to the predefined sending time; and the sending of a synchronization signal block to a terminal in the downlink beam direction in a synchronization frame in which idle carrier sense succeeds comprises: in each synchronization frame, sequentially sendingthe synchronization signal block in a plurality of downlink beam directions corresponding to a predefined sending time at which idle carrier sense succeeds.

4. A signal transmission method, comprising: receiving, by a terminal, a first synchronization signal block sent by a first network device in a downlink beam direction, wherein the first synchronization signal block comprises a first synchronization signal; synchronizing the terminal with the first network device based on the first synchronization signal, receiving, by the terminal, a second synchronization signal block sent by a second network device in a downlink beam direction, wherein the second synchronization signal block comprises a second synchronization signal; the synchronizing the terminal with the first network device based on the first synchronization signal comprises: combining the first synchronization signal sent by the first network device and the second synchronization signal sent by the second network device, to obtain combined synchronization signals; and synchronizing the terminal with the first network device based on the combined synchronization signals; and the method further comprises: synchronizing the terminal with the second network device based on the combined synchronization signals.

5. The method according to claim 4, wherein a downlink measurement signal is a configurable reference signal.

6. A network device, comprising: a processor and a transmitter, wherein the processor is configured to: when a predefined sending time of each synchronization frame in a synchronization frame set arrives, perform idle carrier sense in a downlink beam direction, wherein the synchronization frame set comprises N synchronization frames, N is a positive integer, and each synchronization frame comprises at least one synchronization signal block; and the transmitter is configured to send a synchronization signal block in a synchronization frame to a terminal in the downlink beam direction in which idle carrier sense succeeds, wherein the synchronization signal block comprises a synchronization signal, wherein each synchronization frame corresponds to M downlink beam directions, each synchronization frame has M predefined sending times, different predefined sending times of a same synchronization frame correspond to different downlink beam directions, different synchronization signal blocks of a same synchronization frame correspond to different downlink beam directions, and M is an integer greater than 1; the processor is configured to: when each predefined sendingtime of each synchronization frame arrives, perform idle carrier sense in a downlink beam direction corresponding to the predefined sending time; and the transmitter is configured to: in each synchronization frame, send the synchronization signal block in a downlink beam direction corresponding to a predefined sending time at which idle carrier sense succeeds.

7. The network device according to claim 6, wherein the synchronization signal block in each synchronization frame corresponds to a same downlink beam direction, each of the N synchronization frames corresponds to a different downlink beam direction, and each synchronization frame has a predefined sending time; the processor is configured to: when the predefined sendingtime of each synchronization frame arrives, perform idle carrier sense in a downlink beam direction corresponding to the synchronization frame; and the transmitter is configured to: send a plurality of the synchronization signal blocks in the downlink beam direction corresponding to the synchronization frame in which idle carrier sense succeeds.

8. The network device according to claim 6, wherein each synchronization frame corresponds to M downlink beam directions, each synchronization frame has K predefined sending times, each predefined sending time corresponds to a plurality of different downlink beam directions, synchronization signal blocks of a same synchronization frame correspond to different downlink beam directions, and K is an integergreater than or equal to 1; the processor is specifically configured to perform idle carrier sense once when each predefined sending time of each synchronization frame arrives in the plurality of downlink beam directions corresponding to the predefined sending time; and the transmitter is specifically configured to: in each synchronization frame, sequentially send the synchronization signal block in a plurality& downlink beam directions corresponding to a predefined sending time at which idle carrier sense succeeds.

9. The network device according to claim 6, wherein the synchronization signal block further comprises: a downlink measurement signal and/or a physical broadcast channel (PBCH).

10. The network device according to claim 9, wherein a downlink measurement signal is a configurable reference signal.

11. The network device according to claim 9, wherein the PBCH comprises: time indication information, and/or information about a quantity of synchronization signal blocks comprised in a synchronization frame to which the PBCH belongs, wherein the time indication information is used to indicate a corresponding time location of a synchronization signal block to which the PBCH belongs in the synchronization frame.

12. A terminal, comprising: a receiver and a processor, wherein the receiver is specifically configured to receive a first synchronization signal block sent by a first network device in a downlink beam direction, wherein the first synchronization signal block comprises a first synchronization signal, wherein the receiver is further configured to receive a second synchronization signal block sent by a second network device in a downlink beam direction, wherein the second synchronization signal block comprises a second synchronization signal; and the processor is specifically configured to synchronize with the first network device based on the first synchronization signal and further specifically configured to combine the first synchronization signal sent by the first network device and the second synchronization signal sent by the second network device, to obtain combined synchronization signals; synchronize the terminal with the first network device based on the combined synchronization signals; and synchronize the terminal with the second network device based on the combined synchronization signals.

13. The terminal according to claim 12, wherein a synchronization signal block furthercomprises: a downlink measurement signal and/or a physical broadcast channel (PBCH), and the synchronization signal block is the first synchronization signal block or the second synchronization signal block.

14. The terminal according to claim 13, wherein a downlink measurement signal is a configurable reference signal.

15. The terminal according to claim 13, wherein the PBCH comprises: time indication information, and/or information about a quantity of synchronization signal blocks comprised in a synchronization frame to which the PBCH belongs, wherein the time indication information is used to indicate a corresponding time location of a synchronization signal block to which the PBCH belongs in the synchronization frame.

16. The terminal according to claim 13, wherein the first network device and a second network device perform idle carrier sense at a same start time, and the second network device is any network device that belongs to a same cell as the first network device.

* * * * *

UNITED STATES PATENT AND TRADEMARK OFFICE
CERTIFICATE OF CORRECTION

PATENT NO. : 11,129,191 B2
APPLICATION NO. : 16/583702
DATED : September 21, 2021
INVENTOR(S) : Jun Luo et al.

It is certified that error appears in the above-identified patent and that said Letters Patent is hereby corrected as shown below:

In the Claims

In Column 25, Line 8, in Claim 2, delete "sendingtime" and insert -- sending time --.

In Column 25, Line 37, in Claim 3, delete "sendingthe" and insert -- sending the --.

In Column 25, Line 46, in Claim 4, delete "signal," and insert -- signal; --.

In Column 26, Line 7, in Claim 6, delete "signal," and insert -- signal; --.

In Column 26, Line 15, in Claim 6, delete "sendingtime" and insert -- sending time --.

In Column 26, Line 28, in Claim 7, delete "sendingtime" and insert -- sending time --.

In Column 26, Line 42, in Claim 8, delete "integergreater" and insert -- integer greater --.

In Column 26, Line 49, in Claim 8, delete "plurality&" and insert -- plurality of --.

In Column 27, Line 20 (approx.), in Claim 13, delete "furthercomprises:" and insert -- further comprises: --.

Signed and Sealed this
Twenty-fourth Day of May, 2022

Katherine Kelly Vidal
*Director of the United States Patent and Trademark Office*